Jan. 18, 1927.

J. A. PROCTOR

HIGH POTENTIAL ELECTRICAL APPARATUS

Filed Dec. 12, 1923

INVENTOR
John Albert Proctor
BY
Philip Farnsworth
ATTORNEY

Jan. 18, 1927.
J. A. PROCTOR
1,614,762
HIGH POTENTIAL ELECTRICAL APPARATUS
Filed Dec. 12, 1923    3 Sheets-Sheet 2
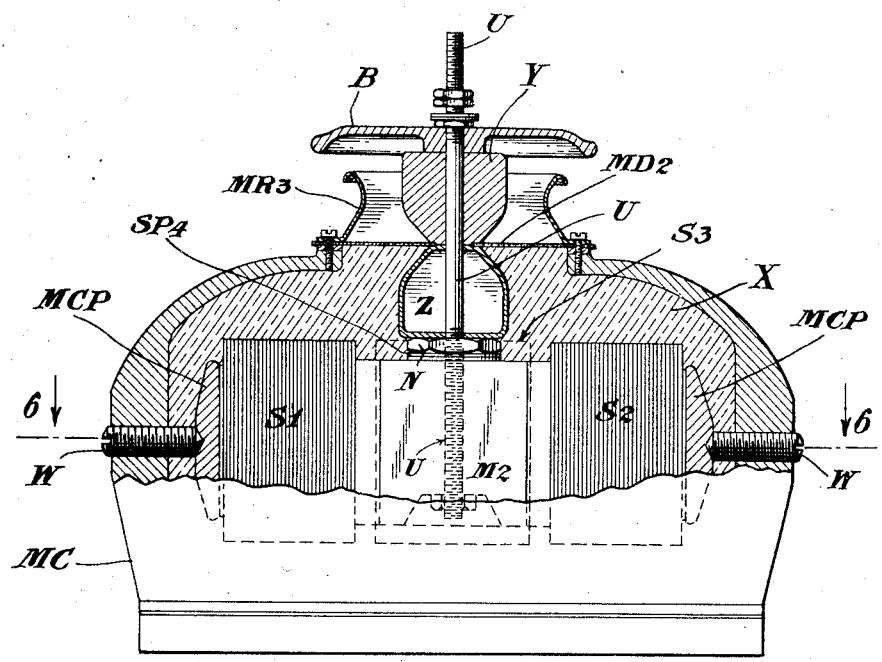
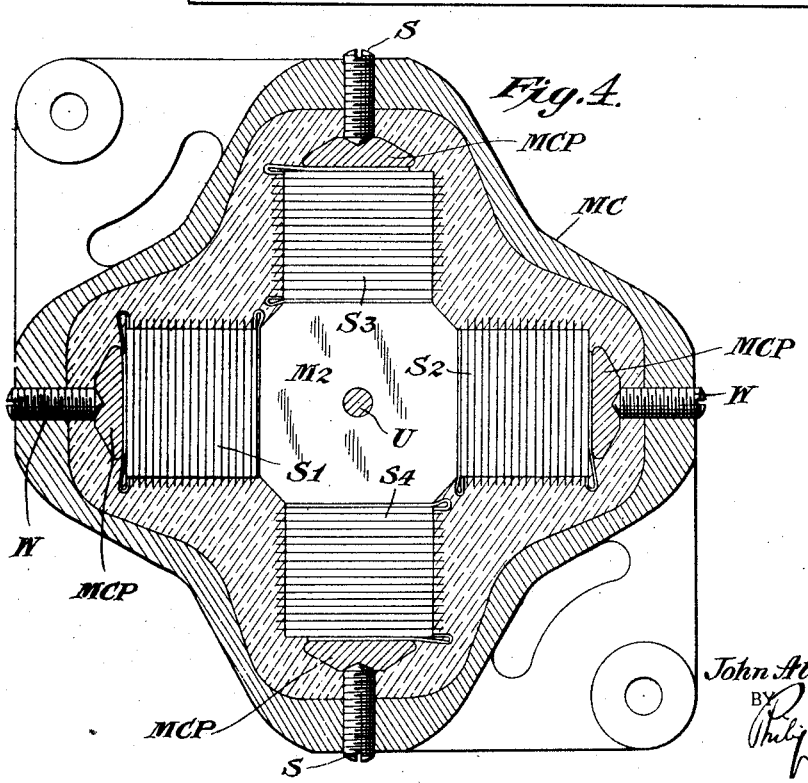
INVENTOR
John Albert Proctor
BY
ATTORNEY Jan. 18, 1927.
J. A. PROCTOR
1,614,762
HIGH POTENTIAL ELECTRICAL APPARATUS
Filed Dec. 12, 1923   3 Sheets-Sheet 3

INVENTOR
John Albert Proctor
BY
ATTORNEY

Patented Jan. 18, 1927.

1,614,762

UNITED STATES PATENT OFFICE.

JOHN A. PROCTOR, OF LEXINGTON, MASSACHUSETTS, ASSIGNOR TO WIRELESS SPECIALTY APPARATUS COMPANY, OF BOSTON, MASSACHUSETTS, A CORPORATION OF NEW YORK.

HIGH-POTENTIAL ELECTRICAL APPARATUS.

Application filed December 12, 1923. Serial No. 680,121.

This invention relates to improvements in electrical devices such as condensers and transformers, especially those involving high potential differences between different parts of the device, and more especially those also operated at high frequencies as in radio communication.

The object of the invention is to reduce heating of high potential insulating material employed, and thereby prevent deterioration or destruction of such insulation.

The invention consists of the arrangements which are illustrated in the drawings (which are about one-half scale) and described in the text, by way of example, in a present-day commercial high potential mica condenser, especially in those adapted for high frequency service.

Fig. 3 is a similar view of the same design of condenser as that of Fig. 2, but illustrating a modified embodiment of the invention therewith.

Fig. 4 is a horizontal section at 6—6 of Fig. 2 to illustrate in plan the general design of the condenser stacks of Figs. 2 and 3.

Figure 1:
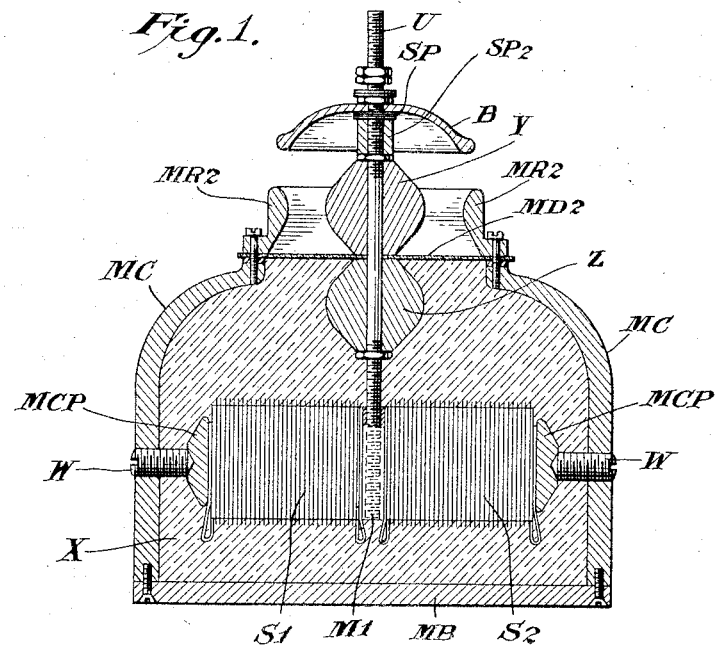
Fig. 1 is a central vertical section of an embodiment of the invention showing the differences from Fig. 5 which involve the application of the invention to the condenser of Fig. 5.
Figure 5:
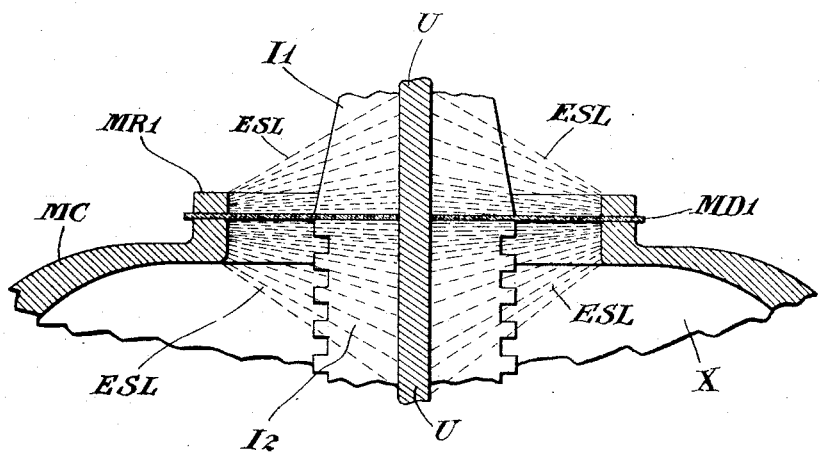
Fig. 5 is a diagram illustrating certain electrical actions in the condenser of the prior art, as contrasted with the electrical actions of the invention as shown in Fig. 6.

The prior art condenser illustrated in Fig. 5 may assume various different forms, just as in the case of Figs. 1–4 and 6 to which the invention is shown as applied. The condenser of Fig. 5, however, is shown because it illustrates a present standard commercial form of mica condenser like Figs. 1–4 or 6 save for the present invention. The arrangement of the pair of stacks in Fig. 1 is known as the "mid-point" arrangement wherein the high potential ends of the two stacks are brought together in the central part of metal casing MC against a metal block $M^1$ in which is secured the high potential stud U at MP. The outer ends of the double stack are electrically and mechanically connected to the sides of the metal casing by way of metal compression plates MCP and screws W, these outer ends being at low potential and they and the metal casing constituting the low potential terminal of the condenser. Preferably the stacks within the metal casing are embedded in a paraffin wax filler X. This preferably is effected after assembly of the condenser by inverting the assembly, lacking metal bottom plate MB, and introducing the molten wax in connection with suitable vacuum treatment; after which the bottom plate MP is screwed for permanent assembly with the casing. The upper part of the casing is formed with an opening to permit passage of high potential stud U. Across this opening there was placed, in the prior art condensers (Fig. 5), a thin mica disk $MD^1$ to close the opening and exclude foreign matter and to retain the wax in the casing, also to insulate high potential stud U from the low potential metal casing. Disk $MD^1$ was secured to the metal casing MC by a metal ring $MR^1$ (Fig. 5) screwed to the casing as shown and thereby electrically constituting a part of the casing. Above disk $MD^1$ and around high potential stud U was mounted an insulator $I^1$, consisting of a built-up and processed stack of mica sheets. Below disk $MD^1$ was a similar insulator $I^2$, (Fig. 5), both insulators $I^1$ and $I^2$ having been intended to insulate high potential stud U from low potential metal casing MC, including metal ring $MR^1$; said insulators also having been intended to prevent creepage from the high potential stud U to the low potential parts of the apparatus. Supported on top of insulator $I^1$ was (as there yet is permissively and preferably) a metal disk or "bell" B, (Fig. 1) serving, among other things, as an electrode of a safety spark-gap between itself and metal retaining ring $MR^1$ of Fig. 5 or $MR^2$ of Fig. 1. The capacity between B and $MR^1$ is adjusted by means of one or more shims SP, to about 1.4 times the rated voltage of the condenser. Prior to the present invention, the "bell" or disk B was designed with the further object of establishing an electrostatic field between B and ring MR¹, (Fig. 5), in order to shunt such field from insulator I¹, thereby to avoid heating of and injury to the latter. While it is believed that such action took place, and successfully accomplished its purpose at voltages up to certain high values, yet certainly it was not adequate to prevent the heating of the high potential insulating material around stud U at yet higher potentials as 50,000 volts more or less, at radio frequencies. The operation of the condenser otherwise was entirely satisfactory, but under very high duty the heating of the insulating material I¹, MD¹ and I², (Fig. 5), was so great as to be serious in causing electrical losses which injured and sometimes destroyed the insulation. I concluded, therefore, that the electrical action taking place might be such as illustrated by the dash lines in Fig. 5, i. e., that notwithstanding the provision of metal disk B of Fig. 1, most of the electrostatic field established between high potential stud U, on the one hand, and metal ring MR¹ (Fig. 5) and metal casing MC at low potential, on the other hand, passed directly between such parts, as shown by electrostatic lines ESL, Fig. 5, and therefore through insulation I¹ and I², thereby causing excessive heating of such insulation, I¹, I² and MD¹, such insulation being a "poor" dielectric as compared with air.

Proceeding on that hypothesis, I modified the condenser of Fig. 5 to the form shown in Fig. 5 wherein the chief differences are the elimination of the insulation I¹ and I² of Fig. 5, the substitution for such insulation of the metal parts Y and Z, and the modification of metal ring MR¹ to the form of ring MR² shown in Fig. 1. The only insulating material left was mica disk MD², which was not changed from disk MD¹ of Fig. 5, save that the disk MD¹ in Fig. 5 is one thirty-second of an inch in thickness and the disk MR² of Fig. 1 was reduced to fifteen thousandths inch in thickness, with a view of reducing the thickness or vertical length of the insulating material to the lowest degree consistent with the function of the disk as a cover for the casing to hold the wax X or other insulating filler, as oil, inside the metal casing MC.

Figure 6:
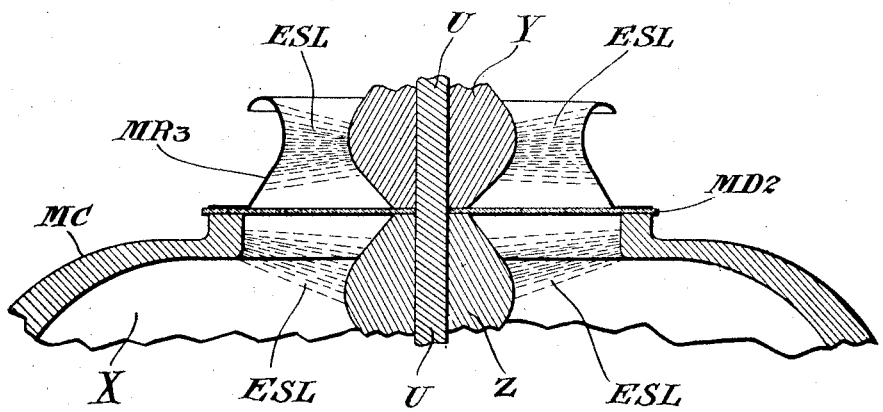
Fig. 6 is a diagram illustrating the different electrical action in the condensers of Figs. 1–4 which results from the embodiment of the invention with the condensers of Fig. 5.

The object of the above changes in Fig. 1 was to determine whether the heating of the insulating material could be reduced so far as not to result in injury to it, and consequently to avoid electrical losses. I believed that the action which would result in Fig. 1 would be that illustrated in Fig. 6 where the electrostatic lines ESL pass chiefly from metal parts Y and Z to the low potential structure, without passing to any serious extent through the mica disk insulator MD². The space between metal part Y and metal ring MR³ of Fig. 6 is an air space which constitutes a perfect dielectric medium. The space between metal part Z and casing MC is filled with wax X which is not seriously injured by heating, although (Fig. 5) lower insulator I² was so injured.

Tests of the arrangement of Fig. 1, under the same conditions which resulted in excessive heating of insulators I¹ and I² of Fig. 5, resulted in mica disk MD² of Fig. 1 running cool, thereby tending to prove my hypothesis shown in Figs. 5 and 6 and certainly demonstrating that my changes in Fig. 1 resulted in avoiding excessive heating of the high potential insulating material, and that perfect operating conditions resulted notwithstanding the substitution of the metal parts Y and Z of Fig. 1 for the insulating material I¹ and I² of Fig. 5.

The effect of the arrangement in Fig. 1 is to localize the electrostatic field away from insulator MD², and to eliminate it, or at least greatly reduce it, in the space occupied by the insulator itself. This localization, however, is effected in places much closer to the insulator than disk B. Preferably, as shown, metal parts Y and Z, which are substituted for the insulators I¹, I² of Fig. 5, are located directly adjacent mica disk MD²; but at locations progressively remote from the disk their surfaces are extended nearer to the metal casing parts, so that at a location not far from the disk MD² there is provided a gap (between Y and MR²) which is substantially shorter than the distance at the insulating disk MD² between the metal casing parts Y, U and the high potential parts. Preferably, also, the metal ring MR² has a similarly formed surface, i. e., from its portion adjacent the insulating disk MD² the surface of MR² gradually approaches the high potential upper metal member Y, so that the shortest gap between MR² and Y is established comparatively close to the mica disk. Beyond this gap, across which the most intense field is established, the surfaces of metal member Y (and Z) preferably are curved in a direction opposite to their curvature upon leaving the mica disk MD²; and preferably the same is true of the inner surface of ring MR²; for the purpose in both instances of avoiding sharp electrode points.

Functions of insulator I¹ of Fig. 5 were to support disk B (Fig. 1) adjustably by shim or shims SP, and to increase mechanical rigidity of stud U; and metal member Y of Fig. 1, substituted for said insulator I², takes up said functions, but preferably an additional metal member SP² is interposed between member Y and shims SP for the following purpose. In Fig. 1, disk B yet serves as an electrode for the safety gap or static shield between itself and ring MR². In fact, disk B is adjusted so that the annular gap between it and ring MR² is adjusted so as to be less than the gap between the proximate surfaces of ring MR² and metal member Y.

Ring MR² and metal members Y and Z are constructed of brass, but other metals may be employed, especially cast aluminum; and where large quantities are involved which will warrant special tools, said members may be formed of sheet metal, as brass or aluminum. So far as concerns the shunting of the electrostatic field from the insulating material, (as MD²), the effective portions of ring MR² and members Y and Z are simply their proximate conducting surfaces, electrically connected respectively with the high and low potential parts of the apparatus.

The intensity of the electrostatic field between the high and low potential conducting parts is a function of the operating voltage and frequency. I believe that the heating of the insulating material in the old form of Fig. 5 was due to the presence of the insulators I¹, I² as imperfect dielectrics lying in the intense radial fields between the high potential stud U and the low potential metal casing MC. I believe that the presence of such imperfect dielectric resulted in substantial power losses which were sufficient in higher voltages and frequencies to cause the undue heating of the insulating material which resulted in its subsequent disintegration. My invention provides for the employment of a minimum amount of undesirable dielectric in the path of the intense electrostatic field (as only thin disk MD¹, Fig. 5, or MD², Fig. 1), and in a path between member Y and ring MR² (Fig. 1) which is entirely through air for the substantial or most intense portion of the electrostatic field.

Fig. 1 shows the lower metal member Z as located further from the metal casing than is upper member Y. The object of this is to provide a lower capacity through wax X inside the casing than through the air gap between Y and MR² outside the casing. This in turn is for the purpose of reducing the losses through the wax which otherwise would be greater than those through the perfect dielectric, air.

Figure 2:
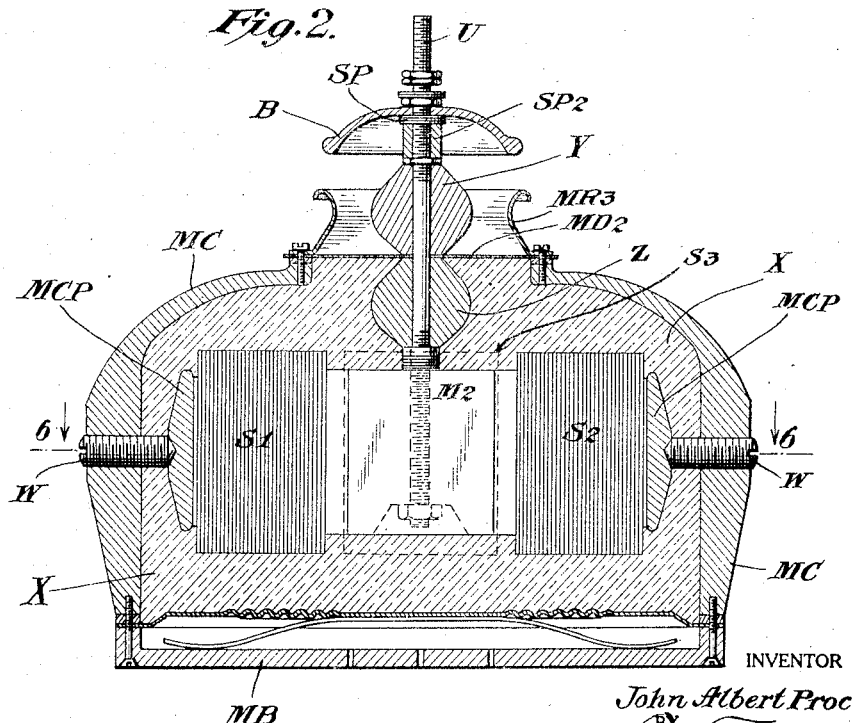
Fig. 2 is a central vertical section of a slightly different design of condenser, and showing the embodiment therewith of a slightly modified form of the invention.

In Fig. 2 is shown another standard form of high potential series sectional sheet stack condenser, and a modified form of clamping ring. Here such ring, MR³, is shown as a sheet metal member, stamped or spun to shape, and strong enough to clamp mica disk MD² to the main part MC of the metal casing,—such thin sheet metal member serving for the invention inasmuch as its conducting surface is the prime electrical functioning part. The condenser stack arrangement shown in Fig. 2 is similar to the type of Fig. 1, save that here four stacks are employed, S¹—S⁴ (see horizontal section, Fig. 4), the four high potential ends of these stacks abutting against a massive heat-absorbing metal block M² in which the high potential stud U is secured as shown. The metal stamping MR³ of Fig. 2 may be applied to any other apparatus having conducting parts of high potential difference and located comparatively close together.

In Fig. 3 is shown a standard condenser of the type of Fig. 2, and in horizontal section in Fig. 4; and to this are applied modified forms of metal members Y and Z which have been substituted for insulators I¹, I² of Fig. 5. The part Z in Fig. 3 is formed hollow, to provide all necessary service for establishing the intense electrostatic field shunting mica disk MD². The upper metal member Y is shown in a form where, above its shortest distance from sheet metal ring MR³, it does not curve away from said ring but extends upwardly in a straight line a sufficient distance to avoid establishment of electrostatic field relations between the metal ring and an edge or pointed surface of member Y.

In Fig. 3 also the members Y and Z are shown in extended heat-conducting contact with one another. In Figs. 1–2, a central portion of the mica covering disk was cut away only sufficiently to permit passage of stud U. In Fig. 3, however, a larger central opening is formed through the mica disk, and in this opening the members Y and Z are permitted to come in contact with one another, and at their outer edges they clamp the mica disk or collar between them at its inner periphery. Below metal nut N screwed on stud U to support members Z, Y and B are placed metal rings SP⁴ around stud U for the purpose of increasing heat conduction from metallic mass M² up through nut N, stud U and metal members Z and Y to disk B, the latter serving as a heat radiator of extended surface. As shown, disk B has extended heat-conducting surface contact with metal member Y. This arrangement serves the double purpose of concentrating the intense field in shunt to mica disk MD² and also in conducting heat from the interior of the condenser. This all illustrates a high duty condenser, the stack portion of which is divided into four portions as shown for the purpose of absorbing heat rapidly into central metallic mass M². The above arrangement around stud U above metallic mass M² serves to conduct away said absorbed heat to heat-radiating member B. If desired yet further to increase the heat conduction of the parts around stud U, lower metal member Z may be formed solid as in Figs. 1 and 2. Such adequate heat-conducting and radiating means serves to prevent melting of wax W inside the casing due to heating of the stack, and thereby prevents disintegration of the wax which otherwise might result in electrical breakdown of the vital parts of the condenser. Metal members Y and Z of Figs. 1–3, substituted for the insulating material I¹, I² of Fig. 5, provide a much larger thermal path from the condenser stacks.

While the use of metal for the casing of electrical apparatus, and for the condensers illustrated, is preferred for various reasons, yet the case itself could be of insulating material; and the invention is not limited to an instance where the casing is of conducting material. Irrespective of the material of the casing, and whether or not it were conducting, the apparatus might have two terminal leads insulated from one another and extending from the interior to the exterior of the casing. In such instances, two of the field-shunting complete assemblies of Fig. 1 would be employed, one for each insulated terminal lead. In fact, that is the case in the standard condenser illustrated in Fig. 1, where the drawing shows only one-half of the condenser, the metal casing MC containing two pairs of stacks like the pairs shown in Fig. 1, each pair having its mid-point high potential member M¹ connected to a high potential stud U provided with the arrangements including the mica disk and the rest of the parts in the upper portion of Fig. 1, the casing being provided with two separate openings, one for each of the two high potential studs.

Shunting the electrostatic field away from the insulating disk MD² reduces the liability to creepage along the disk between the high and low potential parts; that is, the substantial removal of the field from the disk reduces the electrostatic strains to which the disk is subjected. In substituting the metal members Y and Z of Fig. 1 for the insulators I¹, I² of Fig. 5, it might have been thought that it would be necessary to increase the length of extension of the mica disk MD² between the high and low potential parts. But I found that that was not necessary, and it may be that such lack of necessity is due to the reduction of creepage along the disk which accompanied the shunting of the electrostatic field away from the disk. In the use of insulators I¹, I² shown in Fig. 5, it was considered necessary to guard against creepage by the provision of the staggered path illustrated in the lower insulator I². The effectiveness of the new means for shunting the field is thus indicated notwithstanding the total elimination of insulators I¹, I² of Fig. 5.

In Figs. 1–3, the space between ring MR² and central metal member Y is arranged to be somewhat greater than the distance at which the condenser will break down under test or operating conditions. This arrangement is for the purpose of obtaining as intense an eletrostatic field through the perfect dielectric, air, at this location as is possible without danger of breakdown.

It is desirable to have the distances between high potential stud U and lower potential parts as large as is practical, irrespective of the spacing between ring MR² and central metal member Y; that being for the purpose of reducing the inherent capacity between the stud and the low potential parts through any form of imperfect dielectric material necessary to be used between the high and low potential parts, such as the mica disk MD². But such dimensions of the disk are limited by practical considerations, and if the diameter of the disk could be very greatly increased between the high and low potential parts, the invention would be less necessary to reduce heating. In the special case illustrated in the drawings, the design of the metal casing, having a reduced upper portion approaching the top opening, is such as to permit a covering insulator MD² of small diameter which permits its use in the form of a thin mica disk. In this form, the upper part of the casing, below the mica disk, approaches toward central stud U to a distance approximating the general location of ring MR² relative to the stud U. Hence, in this form, it is preferable to substitute lower metal member Z for lower insulator I² of Fig. 5, in addition to substituting metal member Y (Fig. 1) for upper insulator I¹ of Fig. 5; because if this substitution were not made the closeness of the upper part of the metal casing to central stud U would cause heating in lower insulator I² of Fig. 5, or even heating of mica disk MD² if lower insulator I² of Fig. 5 were omitted and no metal part Z of Fig. 1 substituted.

Lower metal member Z is located a greater distance from the low potential parts than is upper metal member Y. Disk B is adjusted by shims SP so that its annular rim is located closer to the part of metal ring MR² than the distance between said ring MR² and upper metal member Y.

The employment of adjustable electrode B for the safety spark-gap, in conjunction with the means below it for shunting the electrostatic field from the insulating cover MD², is very desirable. While it is possible to space upper metal member Y from ring MR² so as to provide a safety gap between them, in addition to shunting the field away from the mica disk, yet it is extremely desirable to have the safety gap adjustable, and at present it seems impracticable to provide an adjustable gap between members Y and MR².

The invention is not limited in its application to series-sectional stacks which are divided up into separate physical portions, as shown. Such forms are shown because they permit rapid heat dissipation and because heat is likely to be generated in the stack itself in condensers designed for such service as to require the use of the invention to reduce heating of the insulating member.

As indicated above, the invention is operative between conducting surfaces of the two parts having a high potential difference between them. Fundamentally, therefore, it consists in providing an arrangement of such conducting surfaces which are respectively electrically connected to the high and low potential terminals. Broadly speaking, the precise manner of arrangement of such surfaces is less material than the fact of the arrangement itself, and the provision of the surfaces shown on the metal members Y, Z and MR² are those which now seem most practical and convenient for use in connection with the standard type of condenser to which the invention thus far has been applied. The substitution of the metal members Y, Z for the insulators I¹, I² of Fig. 5 is, in effect, a reduction of the thickness of the insulating material in a direction at right angles to the shortest line connecting the two conducting parts of high potential difference, and a location of metal members Y, Z quite close to said shortest line connecting the conducting parts.

The covering insulator MD² may be of any desirable insulating material and may have substantially greater thickness than is shown; but the object of the invention in reducing its heating will be effected in proportion as its thickness is comparatively small. If the material of this insulating cover is sufficiently strong or its thickness sufficiently great, or both, it may serve as a compression member to compress the stack against the bottom of casing MC in an instance when the stack is arranged at right angles to the stacks shown in the drawings. In condensers embodying the invention, there may be many variations, the only thing invariable being that there is a high potential difference between two neighboring conducting parts of the apparatus. The heating of insulation which the invetnion prevents is a result of the small over-all volume of the apparatus in proportion to the great potential difference between the two upper conducting parts, and it is such small over-all volume which causes the neighboring relation of the parts which results in heating of insulation in the lack of the invention. The reason for the arrangement of series-sectional sheet-stack is that such an organization results in a potential difference which is high in proportion to the space occupied by the stack. Various methods and means may be employed to clamp the stack, in lieu of the clamping arrangement shown. For example, if desired, the stack may be held under compression by a clamping means independent of the casing but supported within the casing. If the metal casing have straight vertical sides, as distinguished from the curved upper portion shown in the drawings, the lower metal member Z of Figs. 1-3 may be omitted, owing to the consequent increased separation between the part of stud U below mica disk MD², on the one hand, and the nearest part of the side walls of the casing, on the other hand.

I particularly point out and distinctly claim the part, improvement, or combination which I claim as my invention or discovery, as follows:—

1. The improvement in electrical sheet condensers of the type having a stack of series-connected sections and therefore having a high potential difference across the electrical ends of the stack, and having a metal casing enclosing such stack, connected to a low potential part of the stack and having an opening for a terminal lead from a high potential portion of such stack, which lead lies in the neightborhood of a part of the metal casing, and an insulating member covering said opening and through which the terminal lead extends; the improvement comprising means for reducing the heating of the insulating member and consisting of metal members surrounding the high potential lead on both sides of the insulating member and adjacent thereto, said members being electrically connected to said high potential lead and having outer surfaces located at points substantially close to the insulating member, and substantially closer to the low potential metal enclosing casing than is the high potential terminal lead at its portion which extends through the insulating member.

2. The improvement on high potential electrical condensers of the type having a metal enclosing casing for the stack of sheets, the casing being provided with an opening for a high potential lead from the stack, said lead lying in the neighborhood of a part of the metal casing, an insulating member covering said opening, said high potential terminal lead extending through the covering insulator, said improvement consisting of metal members electrically connected with the high potential terminal lead and having outer surfaces located at points substantially close to the covering insulator, and substantially closer to the metal casing than is the high potential terminal lead at its portion which extends through the covering insulator, said metal members being used in place of the insulating members heretofore employed around the high potential lead and respectively above and below the covering insulator.

3. In a sheet-stack condenser of the type comprising a metal casing enclosing the high potential sheet-stack, electrically connected to an electrical end of the stack, to constitute one terminal of the condenser, and having an opening through which extends a lead connected to another electrical end of the stack which lead is located in the neighborhood of a part of the casing; said casing and lead being of high potential difference and lying sufficiently close together to establish an intense electrostatic field between them; and a cover of insulating material for said opening and extending between said lead and casing-terminal, through which cover said lead extends, said insulating cover being of comparatively slight thickness in the direction of extent of said terminal but lying in the normal path of said field; said lead and casing-terminal being provided with substantially extensive conducting surfaces which, at their portions substantially close but not adjacent to said insulating cover, lie closer to one another than they do at their portions adjacent the insulating cover.

4. In an electrical apparatus housed in a metal casing having a high potential lead extending out through an opening in the casing and in the neighborhood of a part of the casing, said casing and lead being of high potential difference and lying sufficiently close together to establish an intense electrostatic field between them; the combination with an insulating cover for said opening and extending between the high potential lead and the metal casing and in the normal path of said field, said insulating cover being of slight thickness in the direction of extension of the high potential lead; of metallic means mounted adjacent the high potential lead and the insulating cover and having a substantially extensive surface which at a location substantially close to the insulating cover but not adjacent thereto lies closer to the metal casing than it does at a location adjacent to the insulating cover.

5. The improvement in reducing the heating of insulating material lying in electrical apparatus between neighboring conducting parts of high potential difference and located sufficiently close together to establish an intense electrostatic field between them which consists in the substitution for a part of the longitudinal dimension of the insulating material, of a member having a substantially extensive conducting surface connected to one of the conducting parts, said surface at a location substantially close but not adjacent to the remaining insulating material being located substantially closer to the other conducting part than the conducting surface and said other conducting part are located to one another adjacent the remaining insulating material itself.

6. In an electrical apparatus having neighboring conducting parts of high potential difference and lying sufficiently close together to establish an intense electrostatic field between them and insulating material between them in the normal path of such field, the means for reducing the heating of the insulating material which consists of an arrangement of substantially extensive surfaces of said conducting parts wherein they approach one another beginning at their portions adjacent the insulating material and become relatively close to one another within a comparatively short distance of the insulating material.

7. In an electrical apparatus having neighboring parts of high potential difference and lying sufficiently close together to establish an intense electrostatic field between them and insulating material between them in the normal path of such field, the improvement consisting in causing a substantially extensive surface of one of said parts to lie much closer to a surface of the other part at a location close but not adjacent to the insulating material than it does adjacent the insulating material itself.

8. In a high potential electrical apparatus of the type having a grounded metal casing enclosing an insulating filler surrounding the electrical apparatus itself, said casing having an opening for a terminal lead and insulating material between the casing and terminal lead at the casing-opening, the improvement consisting of the provision of metal surfaces of the casing and terminal lead lying adjacent the insulating material and respectively inside and outside the casing, said surfaces outside the casing being separated from one another at a location close to said insulating material by an air space shorter than the distance between the casing and terminal lead at the insulating material at the casing-opening; and said surfaces inside the casing being separated from one another by a portion of the insulating filler of shorter length than the distance between the casing and terminal lead at the insulating material at the casing-opening, said surfaces inside the casing being separated a greater distance from one another than the separation of said surfaces outside the casing from one another.

9. In a high potential electrical apparatus of the type having a grounded metal enclosing casing having an opening for a terminal lead, said casing and lead being at high potential difference and sufficiently close together to establish an intense electrostatic field between them and insulating material between the lead and casing at the casing-opening and located in the normal path of such field, the improvement consisting of the provision of substantially extensive metal surfaces of the casing and terminal lead lying outside of the casing and adjacent the insulating material and extending beyond the latter, said surfaces being separated from one another by an air space and lying closer to one another at a location close but not adjacent to the insulating material than they do at the insulating material itself.

10. In a high potential electrical apparatus of the type having a grounded metal casing enclosing an insulating filler surrounding the electrical apparatus itself, said casing having an opening for a terminal lead and insulating material between the lead and casing at the casing-opening, the improvement consisting of the provision of metal surfaces of the casing and terminal lead, which surfaces lie adjacent the insulating material and inside the casing, said surfaces being separated from one another by the insulating filler and lying closer to one another at a location close but not adjacent to the insulating material than they do at the insulating material itself.

11. In an electrical apparatus having neighboring conducting parts of high potential difference and located sufficiently close together to establish an intense electrostatic field between them and an insulating member between them and located in the normal path of such field, the means for reducing heating of the insulating member by such field, which consists of comparatively slight thickness of such member and an arrangement of substantially extensive surfaces of said conducting parts to lie nearer to one another close to but not adjacent said insulating member than they do at the insulating member itself.

12. In an electrical apparatus having neighboring conducting parts of high potential difference and lying sufficiently close together to establish an intense electrostatic field between them, and having an insulator extending between them and located in the normal path of such field, the improved means for substantially shunting said field from said insulator, which comprises two metal surfaces of substantial extent and electrically connected with said conducting parts of high potential difference, and having portions located adjacent said insulator and close to the shortest line between said conducting parts, and also having portions substantially close to but not adjacent said insulator; said metal surfaces lying closer to one another at their portions close to but not adjacent the insulator than they do at their portions adjacent the insulator, establishing between their said more closely related portions a gap constituting a path, in shunt to and substantially close to the insulator, for the intense electrostatic field between said conducting parts of high potential difference.

13. In an electrical apparatus having neighboring conducting parts of high potential difference establishing an intense static field between them, and having an insulator in the normal path of said field, the improvement comprising two conducting surfaces electrically connected to the first of said conducting parts, the first of said surfaces being located adjacent said insulator and extending therefrom, and the second of such surfaces being mounted at a location relatively remote from the first surface; said first surface having a portion close to but not adjacent the insulator, located closer to the second conducting part than is its portion adjacent the insulator, and constituting a field-shunting device; and said second surface having a range of adjustable mounting within a shorter distance from the first conducting part than the shortest distance between said first conducting part and the second surface, and constituting a safety gap.

14. In an electrical apparatus having neighboring conducting parts of high potential difference, and insulating material between them of comparatively slight thickness in the direction at right angles to the shortest line between said conducting parts, and means for reducing heating of said insulating material which comprises the relative arrangement of surfaces of said conducting parts wherein such surfaces lie nearer to one another close to the insulating member than they do at the insulating member itself, such surfaces curving away from one another on both sides of their portions which lie nearest together.

15. In an electrical apparatus having neighboring conducting parts of high potential difference and an insulating member between them of comparatively slight thickness in a direction at right angles to the shortest line between the two conducting parts, two mutually neighboring surfaces of the respective conducting parts located close to said insulating member being arranged to lie closer to one another than do the portions of the respective conducting parts at the insulating member itself; and two other mutually neighboring surfaces of the conducting parts located more remote from the insulating member than said first two surfaces, being arranged to form a safety gap by lying more closely together than said first two surfaces.

16. In a high potential sheet-stack condenser having a metal enclosing casing connected to a low potential part of the stack, said casing having an opening for a terminal lead from a high potential part of the stack, the combination with an insulating disk covering said casing opening and surrounding said high potential lead, and a metal ring as a part of the casing and holding said disk thereto; of a metal disk surrounding the high potential lead outside the casing and spaced from said metal ring to establish a safety gap; and metallic means between said metal disk and said insulating disk and adjacent the latter, said metallic means and metal ring being shaped externally relative to one another to establish between them an air gap near the insulating disk which is longer than said safety gap but shorter than the distance at the insulating disk between the high potential lead and the metal casing.

17. In a high potential electrical apparatus of the type having a grounded metal enclosing casing having an opening for a terminal lead, and insulating material between the lead and casing at the opening, said insulating material being short in the direction of extent of the terminal lead; the improvement consisting of the arrangement of the surface of a portion of the casing to lie closer to the terminal lead at a location near the insulating material than the casing and terminal lead lie to one another at the insulating material itself.

18. In a series-sectional sheet-stack condenser of the type having a stack-enclosing metal casing formed with an opening for a terminal lead from the stack, and an insulating disk closing the opening, the improvement consisting of the provision of a metal member adjacent the insulating disk and outside the casing in contact with atmospheric air, said metal member being in thermal and electrical connection with the terminal lead and formed with a surface which at a location near the insulating disk is separated a less distance from the casing than the dimension of the insulating disk between the terminal lead and the casing.

19. In a series-sectional sheet-stack condenser of the type having a stack-enclosing metal casing formed with an opening for a terminal lead from the stack, and an insulating member of comparatively small thickness closing the opening and located between the terminal lead and the casing and through which insulating member the terminal lead extends, the improvement in the construction of the terminal lead outside the casing and in atmospheric air which comprises a surface of large heat-radiating area, a portion of which close to the insulating member is arranged to lie closer to the metal casing than it does directly at the insulating member.

20. In a series-sectional sheet-stack condenser of the type having a stack-enclosing metal casing formed with an opening for a terminal lead from the stack, and an insulating collar between the terminal lead and casing at said opening and through which the terminal lead extends, the improvement consisting in the provision of two metal members around the terminal lead, one inside and one outside the casing and adjacent the insulating collar and clamping it between them, said metal members being in heat-conducting contact with one another at the inside of the insulating collar and each having an outer surface which at a portion close to the insulating collar is closer to the metal casing than is each metal member directly at the insulating collar.

JOHN A. PROCTOR.